United States Patent [19]
Gorin et al.

[11] Patent Number: 6,044,337
[45] Date of Patent: Mar. 28, 2000

[54] SELECTION OF SUPERWORDS BASED ON CRITERIA RELEVANT TO BOTH SPEECH RECOGNITION AND UNDERSTANDING

[75] Inventors: Allen Louis Gorin, Berkeley Heights; Giuseppe Riccardi, Hoboken; Jeremy Huntley Wright, Warren, all of N.J.

[73] Assignee: AT&T Corp, New York, N.Y.

[21] Appl. No.: 08/960,289

[22] Filed: Oct. 29, 1997

[51] Int. Cl.[7] .............................. G06F 17/28; G10L 5/06; G10L 9/00
[52] U.S. Cl. ................................... 704/1; 704/257
[58] Field of Search ........................... 704/1, 9, 10, 251, 704/255, 256, 257

[56] References Cited

U.S. PATENT DOCUMENTS

| | | | |
|---|---|---|---|
| 5,384,892 | 1/1995 | Strong | 704/256 |
| 5,675,707 | 10/1997 | Gorin et al. | 704/257 |
| 5,794,193 | 8/1998 | Gorin et al. | 704/250 |
| 5,839,106 | 11/1998 | Bellegarda | 704/257 |
| 5,860,063 | 1/1999 | Gorin et al. | 704/257 |

OTHER PUBLICATIONS

Giachin, Egidio P., "Phrase Bigrams For Continuous Speech Recognition" IEEE, 1995, pp. 225–228.

Primary Examiner—Forester W Isen
Assistant Examiner—Patrick N. Edouard

[57] ABSTRACT

This invention is directed to the selection of superwords based on a criterion relevant to speech recognition and understanding. Superwords are used to refer to those word combinations which are so often spoken that are recognized or should have models for such combinations reflected in its grammar. The selected superwords are placed in a lexicon is then used by a speech recognizer to improve recognition of input speech utterances for the proper routing of a user's task objectives.

26 Claims, 5 Drawing Sheets

SELECTION OF SUPERWORDS BASED ON CRITERIA RELEVANT TO BOTH SPEECH RECOGNITION AND UNDERSTANDING

This application is related to co-pending U.S. patent application Ser. No. 08/960,291, entitled "Automatic Generation of Superwords" (Attorney Docket No. JAO 37572), co-filed with this application, and incorporated herein by reference.

BACKGROUND OF THE INVENTION

1. Field of Invention

This invention relates to the selection of superwords and meaningful phrases based on a criterion relevant to both speech recognition and understanding.

2. Description of Related Art

Currently, there are applications of speech recognition that provide a methodology for automated task selection where the targeted task is recognized in the natural speech of a user making such a selection. A fundamental aspect of this method is a determination of a set of meaningful phrases. Such meaningful phrases are determined by a grammatical inference algorithm which operates on a predetermined corpus of speech utterances, each such utterance being associated with a specific task objective, and wherein each utterance is marked with its associated task objective.

The above features are addressed in U.S. patent application Ser. No. 08/528,577, "Automated Phrase Generation", and U.S. Pat. No. 5,675,707, "Automated Call Routing System", both filed on Sep. 15, 1995, which are incorporated herein by reference.

The determination of the meaningful phrases used in the above application is founded in the concept of combining a measure of commonality of words and/or structure within the language—i.e., how often groupings of things co-occur—with a measure of significance to a defined task for such a grouping. That commonality measure within the language can be manifested as the mutual information in n-grams derived from a database of training speech utterances and the measure of usefulness to a task is manifested as a salience measure.

Mutual information ("MI"), which measures the likelihood of co-occurrence for two or more words, involves only the language itself. For example, given War and Peace in the original Russian, one could compute the mutual information for all the possible pairings of words in that text without ever understanding a word of the language in which it is written. In contrast, computing salience involves both the language and its extra-linguistic associations to a device's environment. Through the use of such a combination of MI and a salience factor, meaningful phrases are selected which have both a positive MI (indicating relative strong association among the words comprising the phrase) and a high salience value.

Such methods are based upon the probability that separate sets of salient words occur in the particular input utterance. For example, the salient phrases "made a long distance" would be determined as a meaningful phrases by that grammatical inference algorithm based on their individual mutual information and salience values.

In addition, while the task goal involves recognizing meaningful words and phrases, this is typically accomplished via a large vocabulary recognizer, constrained by stochastic language models, such as an n-gram model. One approach to such modeling to constrain the recognizer is to train a stochastic finite state grammar represented by a Variable Ngram Stochastic Automaton (VNSA). A VNSA is a non-deterministic automaton that allows for parsing any possible sequence of words drawn from a given vocabulary.

Traditionally, such n-gram language models for speech recognition assume words as the basic lexical unit. The order of a VNSA network is the maximum number of words that can be predicted as occurring after the occurrence of a particular word in an utterance. Thus, using conditional probabilities, VNSAs have been used to approximate standard n-gram language models yielding similar performance to standard bigram and trigram models. However, when the "n" in the n-gram becomes large, a database for predicting the occurrence of words in response to the appearance of a word in an utterance, becomes large and unmanageable. In addition, the occurrence of words which are not strongly recurrent in the language may be assigned mistakenly high probabilities, and thus generating a number of misdetections in recognized speech.

Thus, a method to create longer units for language modeling is needed in order to promote the efficient use of n-gram language models for speech recognition and for using these longer units along with meaningful words and phrases for language recognition and understanding.

SUMMARY OF THE INVENTION

A method and apparatus for using superwords and meaningful phrases for both speech recognition and understanding is provided. For superwords, a training corpus T is initialized with the initial language model corresponding to a stochastic n-gram model and words. Rank candidate symbol pairs are generated based on a correlation coefficient where the probability of a word occurring denotes the probability of further words occurring sequentially. The resulting superword is selected only if the probabilities occur sequentially and the training set perplexity decreases by the incorporation of the larger lexical unit (or superword) into the model.

In addition, meaningful words and phrases are selected which have both a mutual information value that indicates a relatively strong association among the words comprising the phrase, and a high salience value. The selected meaningful words and phrases are input along with the superwords into a common lexicon which provides input to a speech recognizer and interpretation module. The lexicon consists of all of the meaningful words and phrases, existing superwords, and newly generated superwords. The language model is then retrained using this lexicon.

BRIEF DESCRIPTION OF THE DRAWINGS

The invention is described in detail with reference to the following drawings wherein like numerals reference like elements, and wherein.

DETAILED DESCRIPTION OF PREFERRED EMBODIMENTS

N-gram language models for speech recognition are currently implemented by using words as the basic lexical unit.

However, there are several motivations for choosing longer units for language modeling. First, not all languages have a predefined word unit (e.g. Chinese). Second, many word groups or phrases are strongly recurrent in the language and can be thought as a single lexical entry, e.g. 'area code', 'I would like to' or 'New Jersey'. Third, for any model of a fixed order, we can selectively enhance the conditional probabilities by using variable length units to capture long spanning dependencies. The use of these longer lexical units is the basis for the generation of superwords.

The method for automatically generating and selecting such variable length units, or superwords is based on minimization of the language perplexity PP (T) on a training corpus T.

Perplexity can be described as follows. Natural language can be viewed as an information source W whose output is a word sequence. Thus, we can associate W to the entropy H(W) as:

$$H(W) = -\frac{1}{n}\log P(w_1, w_2, \ldots, w_n) \quad (1)$$

where $w_1, w_2, \ldots, w_n$ is the actual text (corpus)

Perplexity (PP) is used in speech recognition to measure the difficulty of a recognition task relative to a given language model. In particular, perplexity measures the "Average Branching Factor" (i.e., the average number of words, symbols or sounds that can follow any given word, symbol or sound). The larger the number of words that could possibly follow one or more words, symbols or sounds, the higher the perplexity value. For example, there are many more words that could follow the word "to" (higher perplexity value) than can follow the phrase "I would like to" (lower perplexity value).

The Perplexity of a language model is defined as follows:
$PP=2^{LP}$
where LP is the logprob:

$$LP = -\frac{1}{n}\log \hat{P}(w_1, w_2, \ldots, w_n) \quad (2)$$

where n is the size of the corpus $W=w_1, w_2, \ldots, w_n$ used to estimate PP and $\hat{P}(w_1, w_2, \ldots, w_n)$ is the probability estimate of the corpus W. While there has been other research into automatically acquiring entropy-reducing phrases, this work differs significantly in the language model components and optimization parameters.

On the other hand, the determination of meaningful phrases used is founded in the concept of combining a measure of commonality of words and/or structure within the language—i.e., how often groupings of things co-occur—with a measure of significance to a defined task for such a grouping. That commonality measure within the language can be manifested as the mutual information in n-grams derived from a database of training speech utterances and the measure of usefulness to a task is manifested as a salience measure.

Figure 1A:
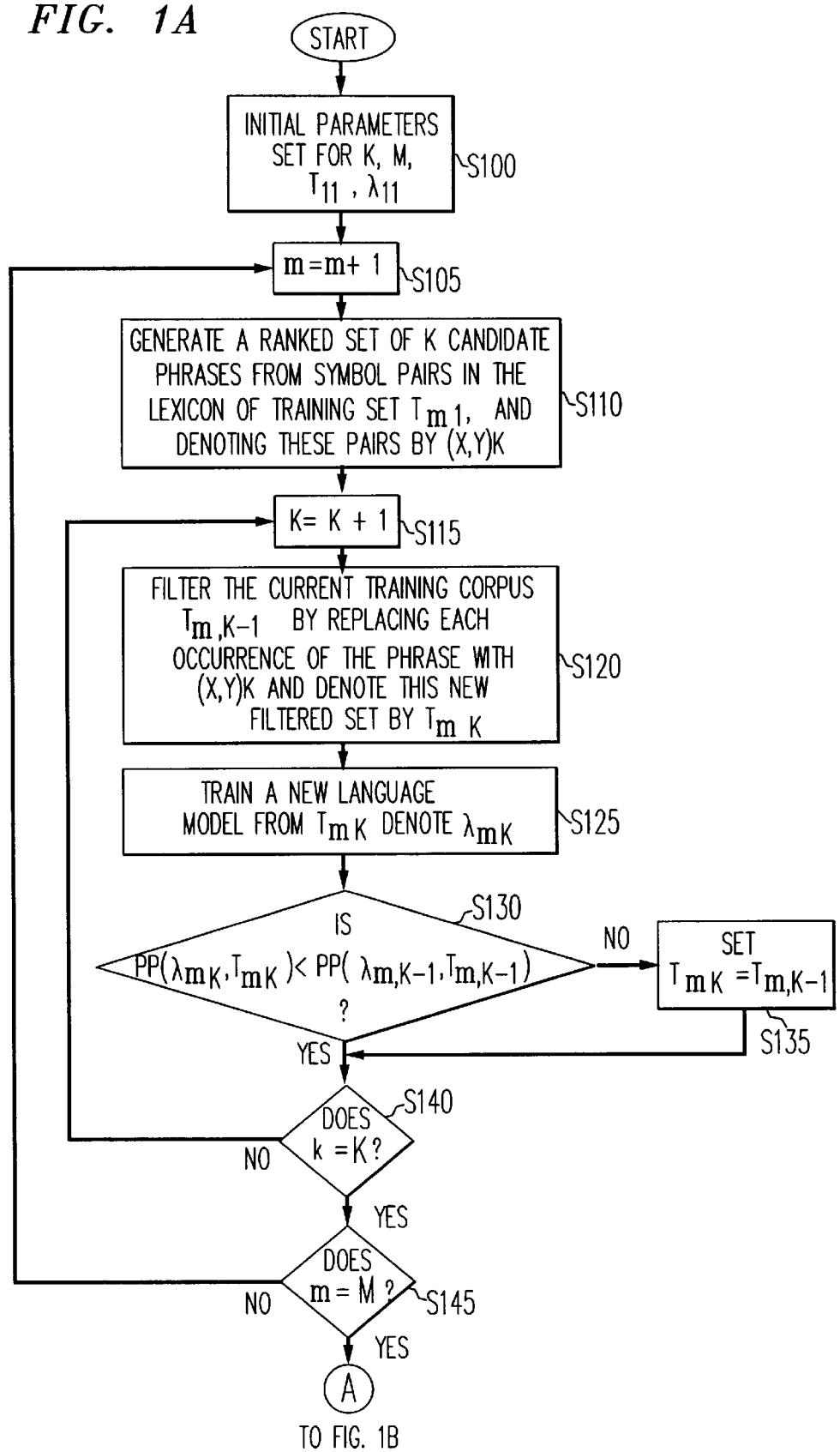
FIGS. 1A and 1B are flowcharts for generating and selecting superwords and meaningful phrases.
Figure 1B:
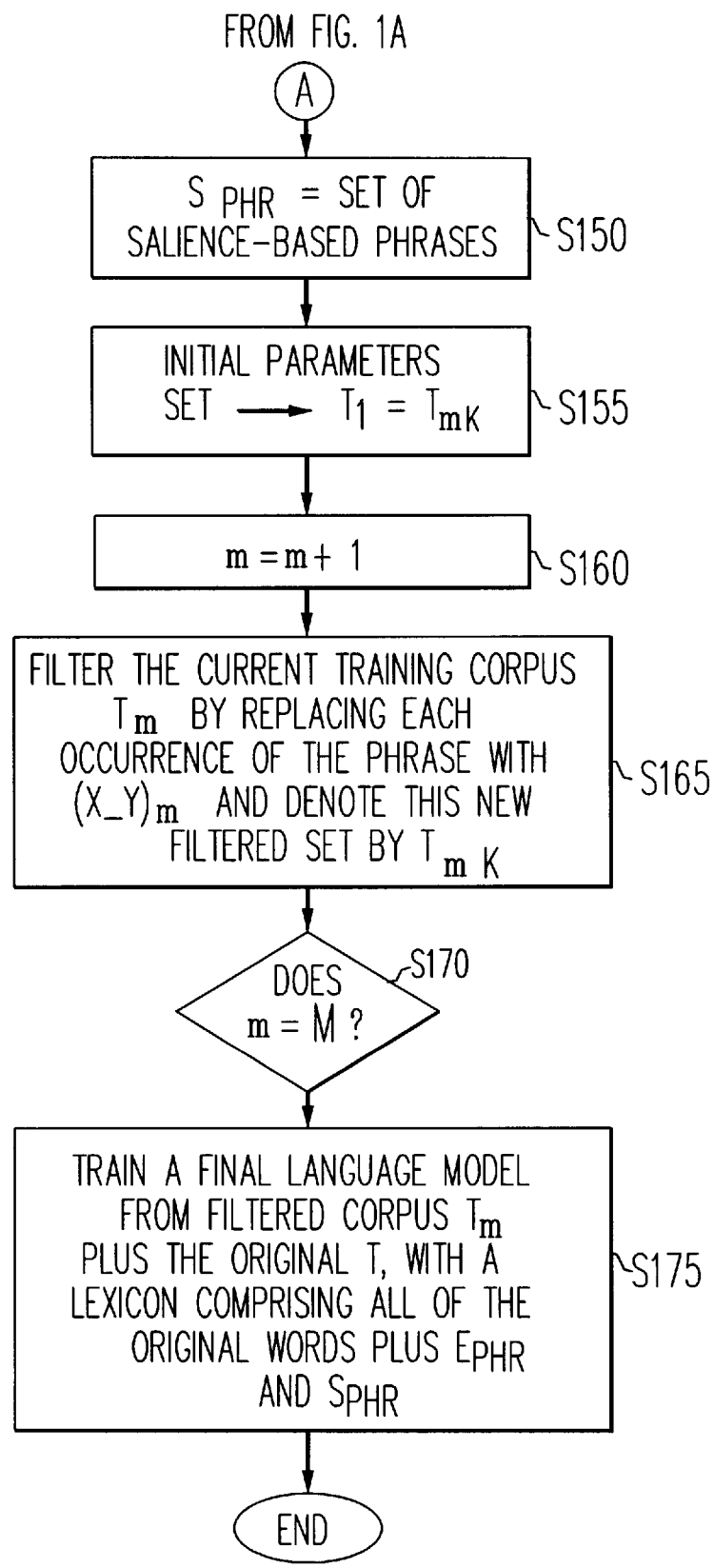

As shown in FIGS. 1A and 1B, the phrase acquisition method is an iterative process which generates a set of Entropy-based superwords (Ephr) and a set of Salience-based meaningful words and phrases (Sphr). In particular, given a fixed model order n and a training corpus T, the method proceeds as follows.

At step S100, the initial parameters are set so that K equals the number of superword candidates generated at each iteration, and M equals the number of iterations, $T_{11}$, is set as the initial training corpus T, and $\lambda_{11}$ is set as the language model of order n corresponding to a stochastic n-gram model on words trained from that corpus. At step S105, a counter m is advanced from 1 to M, M being the number of iterations set in the parameters at step S100.

At step S110, for each iteration, candidate symbol-pairs (x,y) are ranked and generated based on a correlation coefficient $$\rho(x,y)=P(x,y)/[P(x)+P(y)] \quad (3)$$

where P(x) denotes the probability of the event x and P(x,y) denotes the probability of the symbols x and y occurring sequentially. At the first iteration, x and y are both words, in subsequent iterations they are potentially larger units. Observe that $0 \leq \rho(x,y) \leq 0.5$. This correlation measure provides advantages with respect to ease of scaling and thresholding.

At step S115, a counter is advanced for each candidate phrase so that k=1 to K, where K is the set of superword candidates. At step S120, the current training corpus $T_{m,k-1}$ is filtered by replacing each occurrence of a superword with the superword unit $(x\_y)_k$. The new filtered superword set is denoted by $T_{mk}$.

At step S125, a new language model (still of order n) is trained from $T_{mk}$. The newly trained model is denoted by $\lambda_{mk}$. At step S130, a test is performed to determine whether adding the superword candidate decreases perplexity (i.e., whether $PP(\lambda_{mk}, T_{mk})<PP(\lambda_{m,k-1}, T_{m,k-1})$). If perplexity is decreased, the process is continued. If perplexity is not decreased, the superword candidate is rejected at step S135 by setting $T_{mk}=T_{m,k-1}$. Thus, a phrase x_y is selected only if $P(x,y)=P(x)=P(y)$ (i.e., $P(y|x)$ =I) I and the training set perplexity is decreased by incorporating this larger lexical unit into the model.

At step S140, the method tests whether any additional superword candidates, k, are required to be examined. At step S145, after all of the superword candidates are examined, the next iteration is performed, m, until m=M. The resulting set of superwords generated is designated as Ephr.

Next, at step S150, a set of salience-based phrases Sphr are selected as candidate phrases. At step S155, the training corpus $T_1$ is initialized and set as $T_{MK}$. At step S160, a counter m is advanced from 1 to M, M being the number of iterations to be performed for each candidate phrase in Sphr.

At step S165, the current training corpus $T_m$ is filtered by replacing each occurrence of the phrase with the phrase unit $(x\_y)_m$. This new filtered set is denoted by $T_{m+1}$. At step S170, the next candidate phrase is retrieved until m=M. The resulting set of salience-based meaningful phrases is designated Sphr.

Finally, at step S175, a final language model from the filtered corpus $T_M$ plus the original T is trained with the lexicon comprising all original words plus the phrases contained in the sets Ephr and Sphr. This preserves the granularity of the original lexicon, generating alternate paths comprising both the new phrases plus their original word sequences. i.e., if the words "long" and "distance" only occur together in the corpus leading to the acquisition of the phrase "long_distance", this final step preserves the possibility of the recognized words occurring separately in some test utterance.

A decision is then made as to how to classify an utterance in a particularly straightforward manner. A speech recognizer is applied to an utterance, producing a single best word recognition output. This ASR output is then searched for occurrences of the salient phrase fragments. In case of fragment overlap, some parsing is required. The method for parsing is a simple one in that longer fragments are selected over shorter ones proceeding left to right in the utterance. This yields a transduction from the utterance s to a sequence of associated call-types. To each of these fragments $f_i$ is associated the peak value and location of the a posteriori distribution.

$$P_i = \max_k P(C_k|f_i) \quad (4)$$

$$k_i = \arg\max_k P(C_k|f_i) \quad (5)$$

Thus, for each utterance s we have a sequence $\{f_i, k_i, p_i\}$. The decision rule is to select the call-type of the fragment with maximum $p_i$, i.e. select $C_{K(s)}$ where $$i(s) = \arg\max_i p_i \quad (6)$$

$$K(s) = k_{i(s)} \quad (7)$$

If this overall peak is less than some threshold, $P_T$, then the utterance is rejected and classified as other, i.e. if $p_{i(s)} < P_r$.

Figure 2:
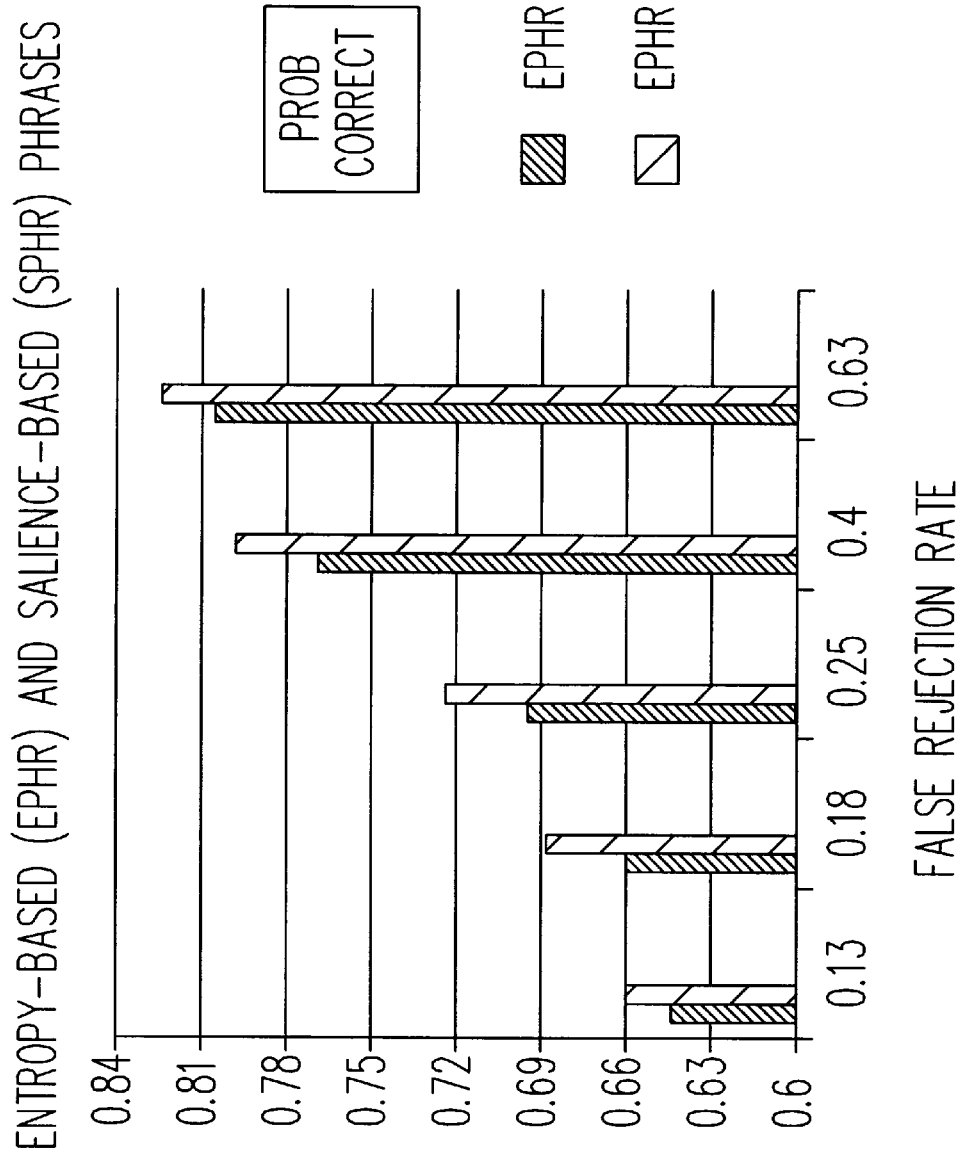
FIG. 2 is a chart showing the false rejection rate for entropy-based and salience-based phrases.

FIG. 2 shows the difference in the "False Rejection Rate" (the number of transactions misdirected or misunderstood by a machine based on inputs from a user) for speech recognizers using a lexicon with generated superwords versus a lexicon using generated superwords and meaningful phrases. The lexicon containing the generated superwords plus meaningful phrases produces fewer false rejections than the lexicon with only generated superwords and therefore leads to better understanding of a user's language patterns.

Figure 3:
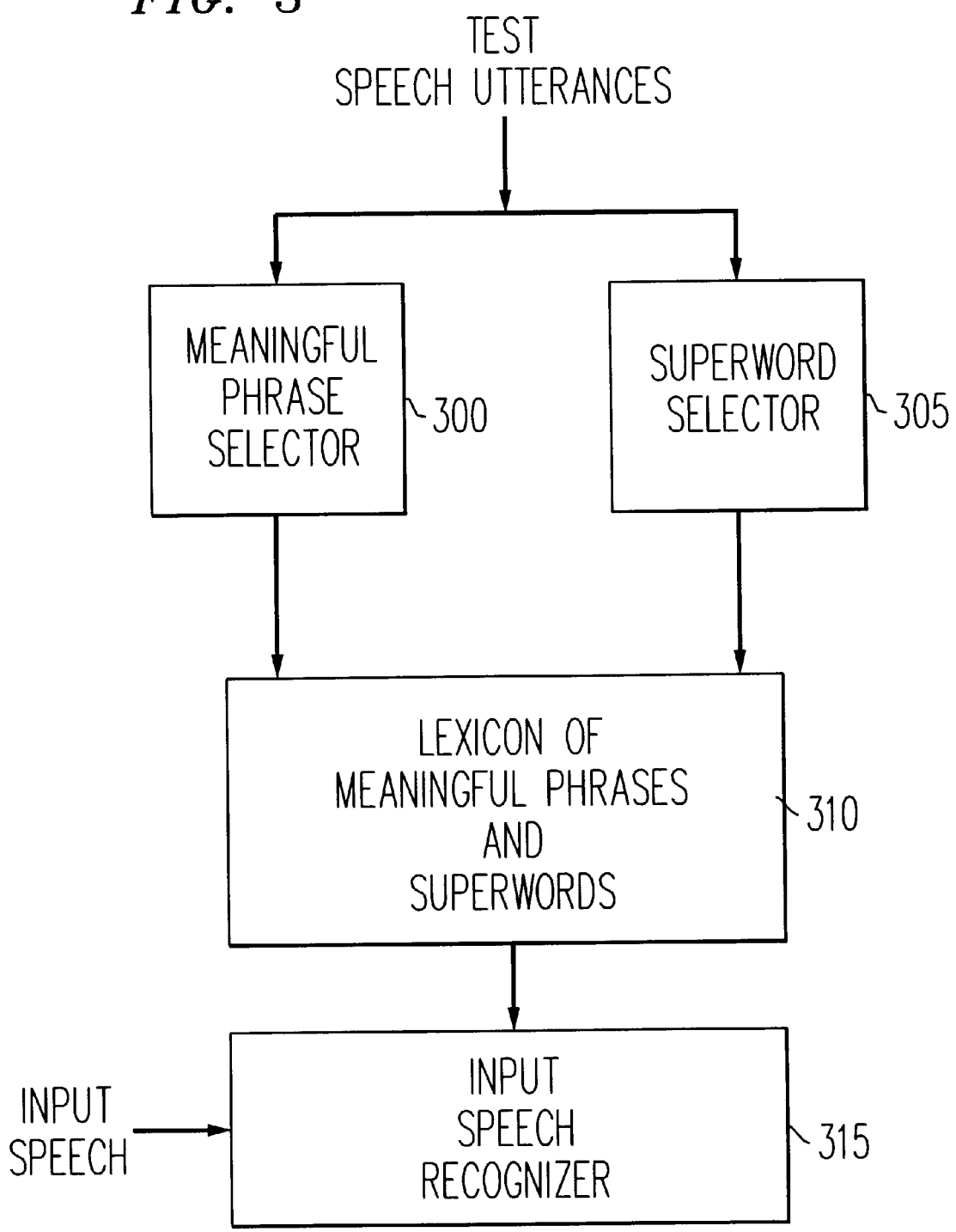
FIG. 3 is a block diagram of a speech recognizer.

FIG. 3 shows a configuration for a Speech Recognizer 315 receiving both superwords and meaningful phrases. Both the Meaningful Phrase Selector 300 and the Superword Selector 305, are trained using test speech utterances and select meaningful phrases and superwords in accordance with the methods set forth above. Once the meaningful phrases and superwords have been selected, they are input to a Lexicon 310. The Lexicon 310 is essentially a standard database and can be stored in any known internal or external memory device. The Lexicon 310 serves as a source of meaningful phrases and superwords which the Speech Recognizer 315 looks for in input speech. The Speech Recognizer 315 can be any standard speech recognizer known in the art.

Figure 4:
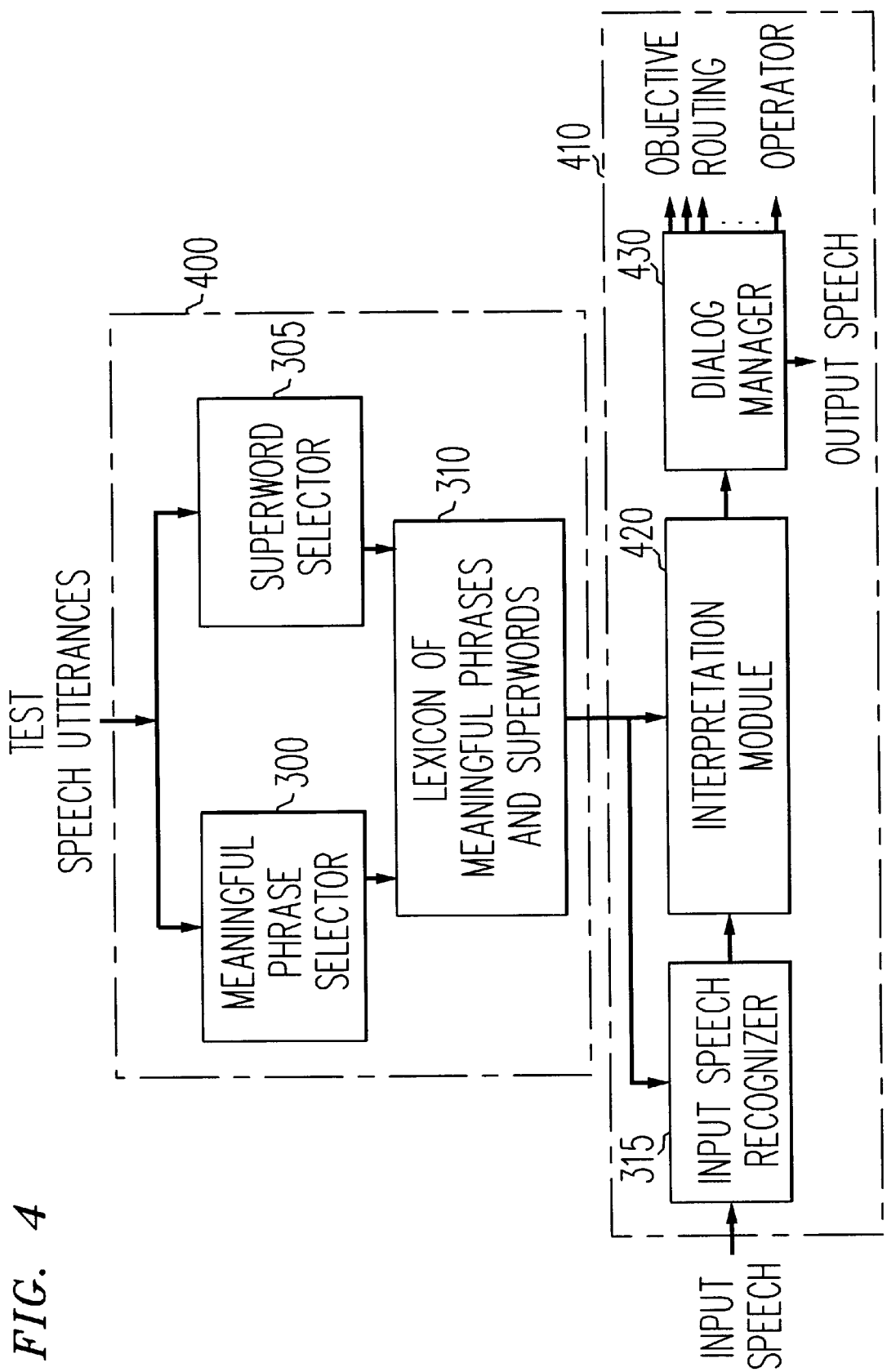
FIG. 4 is a functional block diagram of system in which the method for selecting superwords may be employed.

FIG. 4 shows a structure in which the resulting lexicon of meaningful phrases and superwords may be implemented. As can be seen from the drawing, the structure comprises two related subsystems: The Superword and Meaningful Phrase Generation Subsystem 400 and Input Speech Classification Subsystem 410.

The Superword and Meaningful Phrase Generation Subsystem 400 operates on a database or lexicon of a large number of utterances each of which is related to one of a predetermined set of routing objectives, where each such utterance is labeled with its associated routing objective. The operation of this subsystem is essentially carried out by Meaningful Phrase Selector 300 and Superword Selector 305 which select as outputs a set of meaningful phrases and superwords having a probabilistic relationship with one or more of the set of predetermined routing objectives with which the input speech utterances are associated. The selected meaningful phrases and superwords are then input into the Lexicon 310 which stores the meaningful phrases and superwords for use by the Input Speech Classification Subsystem 410. The operation of Meaningful Phrase Selector 300 and the Superword Selector 305 are generally determined in accordance with any known algorithm for selecting meaningful phrases and superwords including the methods disclosed herein.

Operation of Input Speech Classification Subsystem 410 begins with inputting a user's task objective request, in the caller's natural speech, to Input Speech Recognizer 315. The Input Speech Recognizer 315 may be of any known design and performs the function of recognizing, or spotting, the existence of one or more meaningful phrase in the input speech. As can be seen in the figure, the meaningful phrases and superwords developed by the Superword and Meaningful Phrase Generation Subsystem 400 are provided as an input to the Input Speech Recognizer 315 to define the routing objectives related to meaningful phrases and superwords and to establish the levels of probability for a relation of such input meaningful phrases and superwords to a particular routing objective.

The output of the Input Speech Recognizer 315, which includes the detected meaningful phrases and superwords appearing in the caller's routing objective request, is provided to Interpretation Module 420. The Interpretation Module 420 compiles a list of probable routing objectives based on the probabilistic relation between the recognized meaningful phrases and superwords and selected routing objectives. The Interpretation Module 420 then inputs a list of possible routing objectives to the Dialog Manager 430. In the Dialog Manager 430, a decision is made either to implement the chosen routing objective with an announcement to the caller that such an objective is being implemented (if only one objective is possible), or to seek additional information and/or confirmation from the caller (if none or more than one objective are possible). Dialog continues until either a clear decision can be made to implement a particular routing objective or a determination is made that no such decision is likely, in which case the caller is defaulted to an operator position.

While this invention has been described in conjunction with specific embodiments thereof, it is evident that many alternatives, modifications and variations would be apparent to those skilled in the art. Accordingly, preferred embodiments in the invention as set forth herein are intended to be illustrative, not limiting. Various changes may be made without departing from the spirit and scope of the invention as defined in the following claims.

What is claimed is:

1. A method for determining superwords and meaningful phases, comprising the steps of:

determining superwords from a set of generated candidate phrases contained in a database of observed sequences of words, symbols and/or sounds, the database having a perplexity value based on a language model;

determining meaningful phrases based on commonality measurements; and incorporating the determined meaningful phrases from the database into the language model.

2. The method of claim 1, wherein the step of determining superwords determines how each candidate phrase affects the perplexity value of the database so that if the perplexity value decreases, the candidate phrase is added to the database as a superword, and if the perplexity value is not decreased, the candidate phrase is not added to the database.

3. The method of claim 1, wherein the step of determining the meaningful phrases determines meaningful phrases based on salience and mutual information measurements.

4. The method of claim 1, further comprising the step of:
   training a speech recognizer using the database.

5. The method of claim 1, further comprising the step of:
   interpreting a user's input using the database.

6. The method of claim 5, further comprising the step of:

implementing one or more of a set of task objectives based on the user's input.

7. An apparatus that determines superwords and meaningful phases, comprising:

a database of observed sequences of words, symbols and/or sounds containing a generated set of candidate phrases, the database having a perplexity value based on a language model;

superword selecting means for selecting superwords, the selected superwords being incorporated from the database into the language model; and meaningful phrase selecting means for selecting meaningful phrases based on commonality measurements, the selected meaningful phrases being incorporated from the database into the language model.

8. The apparatus of claim 7, wherein the superword selecting means creates a ranked set of candidate phrases from the database.

9. The apparatus of claim 8, wherein the superword selecting means inputs each of the candidate phrases into the database and determines whether the inserted candidate phrase decreases the perplexity value of the database.

10. The apparatus of claim 9, wherein the superword selecting means determines that if the perplexity value decreases, the inserted candidate phrase is added to the database as a superword, and if the perplexity is not decreased, the inserted candidate phrase is not added to the database.

11. The apparatus of claim 7, wherein the meaningful phrase selecting means selects the meaningful phrases based on salience and mutual information measurements.

12. The apparatus of claim 7, further comprising:

recognizing means for recognizing, based on a user's input, at least one meaningful phrase or superword contained in the database.

13. The apparatus of claim 12, wherein the database trains the recognizing means.

14. The apparatus of claim 12, further comprising:

interpretation means for making a classification decision based on the recognized meaningful phrases and superwords.

15. The apparatus of claim 14, wherein the interpretation means implements one or more task objectives based on the user's input.

16. The apparatus of claim 15, further comprising:

dialog means for obtaining additional input from the user in order to implement one or more of the task objectives.

17. An apparatus that determines superwords and meaningful phases, comprising:

a database of observed sequences of words, symbols and/or sounds containing a generated set of candidate phrases, the database having a perplexity value based on a language model;

a superword selector that selects superwords, the superword selector incorporating the selected superwords from the database into the language model; and a meaningful phrase selector that selects meaningful phrases based on commonality measurements, the meaningful phrase selector incorporating the selected meaningful phrases from the database into the language model.

18. The apparatus of claim 17, wherein the superword selector creates a ranked set of candidate phrases from the database.

19. The apparatus of claim 18, wherein the superword selector inserts each separate candidate phrase into the database and determines whether the inserted candidate phrase decreases the perplexity value of the database.

20. The apparatus of claim 19, wherein the superword selector determines that if the perplexity value decreases, the candidate phrase is added to the database as a superword, and if the perplexity is not decreased, the candidate phrase is not added to the database.

21. The apparatus of claim 17, wherein the meaningful phrase selector selects a set of meaningful phrases based on salience and mutual information measurements.

22. The apparatus of claim 17, further comprising:

a recognizer that recognizes, from a user's input, at least one of the selected meaningful phrases and superwords contained in the database.

23. The apparatus of claim 22, wherein the database trains the recognizer.

24. The apparatus of claim 22, further comprising:

an interpretation module that makes a classification decision based on the recognized meaningful phrases and superwords.

25. The apparatus of claim 24, wherein the interpretation module implements one or more task objectives based on the user's input.

26. The apparatus of claim 25, further comprising:

a dialog manager that obtains additional input from the user to implement one or more of the task objectives.

* * * * *